United States Patent Office 3,845,073
Patented Oct. 29, 1974

3,845,073
2-(HALOPHENYL)-1H-BENZ[g]INDOL-3-YLACETIC ACID DERIVATIVES
Robert Anthony Newberry, Portsmouth, England, assignor to John Wyeth & Brother Limited, Taplow, England
No Drawing. Filed May 25, 1972, Ser. No. 256,674
Claims priority, application Great Britain, June 3, 1971, 18,767/71
Int. Cl. C07d 27/56
U.S. Cl. 260—326.13 R                                    4 Claims

ABSTRACT OF THE DISCLOSURE

The invention concerns novel benz[g]indolylaliphatic acids and derivatives thereof, and processes for their preparation. The compounds are pharmacologically efficacious as anti-inflammatory agents.

This invention relates to novel heterocyclic aromatic compounds, to processes for the preparation thereof and to pharmaceutical compositions containing such compounds. The heterocyclic compounds concerned in this invention are benz[g]indoles substituted by a radical derived from an aliphatic acid containing from two to six carbon atoms or a derivative thereof.

Accordingly, the present invention provides compounds of the general formula

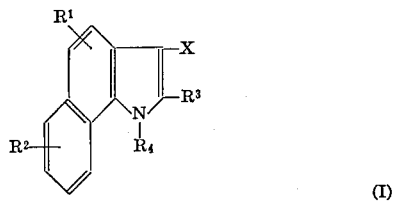

(I)

in which $R^1$ and $R^2$, which may be the same or different, represent a hydrogen or halogen atom or a lower alkyl or lower alkoxy radical, $R^3$ is a lower alkyl radical or a substituted or unsubstituted aryl radical (which includes heteroaryl radicals), $R^4$ is a hydrogen atom or an aroyl radical (which includes hetero-aroyl radicals and X is a radical derived from an aliphatic acid containing from two to six carbon atoms (including ethylenically unsaturated acids) or a derivative thereof.

The term "lower" as used herein means the radicals contain up to six carbon atoms; lower alkyl radicals containing up to four carbon atoms are preferred.

The compounds of the above general formula (I) exhibit pharmacological activity such as anti-inflammatory activity as shown by tests on warm-blooded animals; some are also intermediates in the preparation of other benz[g]indoles.

Examples of radicals $R^3$ are lower alkyl radicals such as methyl, ethyl, propyl and butyl or aryl radicals such as unsubstituted phenyl or phenyl substituted by halogen (for example by fluorine, chlorine or bromine), by lower alkyl (for example by methyl, ethyl, propyl or butyl), by lower alkoxy (for example by methoxy, ethoxy, propoxy or butoxy), by nitro, by amino (including alkyl-substituted amino groups) in particular by dialkylamino (for example by dimethylamino), by trifluoromethyl, by mercapto, by methylthio or by methylsulphonyl as well as 1- and 2-naphthyl; or hetero-aryl radicals such as 2- and 3-furyl, 2- and 3-thienyl, 2-, 3- and 4-pyridyl, 2- and 3-indolyl and 2- and 3-pyrrolyl. The radical X preferably is a radical derived from an aliphatic acid containing from two to six carbon atoms, more preferably from two to four carbon atoms, or is a suitable derivative thereof, for example an ester, amide, thioamide, salt or hydroxamic acid derivative thereof. Preferred examples of radical X are those derived from acetic, propionic, and butyric acids as well as unsaturated acids, such as acrylic acid. The radicals $R^1$ and $R^2$, which may be the same or different, represent a hydrogen atom or a halogen atom (for example fluorine, chlorine or bromine) or a lower alkyl radical (for example methyl, ethyl, propyl or butyl) or a lower alkoxy radical (for example methoxy, ethoxy, propoxy or butoxy). The radical $R^4$ is a hydrogen atom or an aroyl radical such as an unsubstituted benzoyl or naphthoyl radical or a benzoyl radical substituted by the same substituents mentioned above in connection with the aryl radical $R^3$ or is a hetero-aroyl radical such as a 2- and 3-furoyl, 2- and 3-thenoyl, 2-, 3- and 4-pyridylcarbonyl, and 2- and 3-indolylcarbonyl.

The compounds of general formula (I) may be prepared by cyclising one or more compounds appropriately substituted by radicals $R^1$, $R^2$, $R^3$, and $X^1$ to give a benz[g]indole of formula

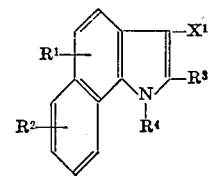

(II)

(in which $R^1$, $R^2$ and $R^3$ have the meanings defined above, $R^4$ is a hydrogen atom and $X^1$ has the same meanings as X or is a hydrogen atom or precursor group of X convertible thereto), and in those benz[g]indoles wherein $X^1$ does not have the same meaning as X the group $X^1$ is converted to X by known methods, and if desired one or more of the groups $R^1$, $R^2$, $R^4$ and X may be converted to another group $R^1$, $R^2$, $R^4$ and X respectively, each within its own meanings defined above.

The preparation of benz[g]indoles of general formula (II) in which $R^1$, $R^2$, and $R^3$ have the meanings already defined, $R^4$ is a hydrogen atom and $X^1$ has the same meanings as X or is a hydrogen atom or precursor group of X convertible thereto, may be carried out by methods known in the art for making indole derivatives and reference is made to the following publications: Elderfield, "Heterocyclic Compounds" Volume 3, pages 1 to 75 (1952) and Sumpter and Miller, "Heterocyclic Compounds With Indole and Carbazol Systems" in the series, "The Chemistry of Heterocyclic Compounds," edited by Weissberger, pages 1 to 69 (1954).

Of particular value in preparing the above mentioned compounds of formula (II) are the following reactions:
(A) The cyclisation of a hydrazone of general formula

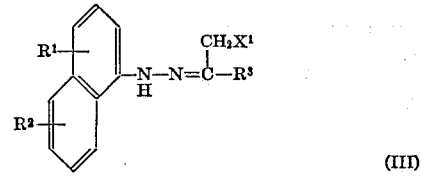

(III)

under the influence of an acid-type catalyst. This reaction is usually referred to as the Fischer Indole synthesis. In some instances, when preparing the hydrazones of formula (III) by reaction of the corresponding naphthylhydrazine and ketone, the hydrazone cannot be isolated and the reaction proceeds through to the benz[g]indole in one step.

(B) The use of the Madelung Synthesis in which a substituted naphthylamine of formula

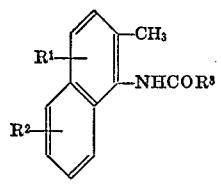

(IV)

is cyclised under basic conditions, gives rise to compounds of general formula (II) in which $X^1$ and $R^4$ are hydrogen atoms.

(C) The Bischler Synthesis, in which an α-naphthylamine (V)

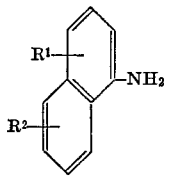

(V)

is reacted with an α-halo carbonyl compound of the formula (VI)

(VI)

gives rise to compounds of formula (II) in which $R^4$ is a hydrogen atom.

(D) The following seven less preferred reactions, which all bear a formal analogy to each other in that the heteroring is formed by cyclization of a two-carbon chain in the ortho-position to the amino group in α-naphthylamine, can be used for the preparation of compounds of formula (II):

(i) The Lipp Synthesis in which a compound of formula

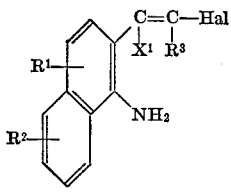

(VII)

is cyclised under basic conditions.

(ii) Cyclisation of a compound of formula

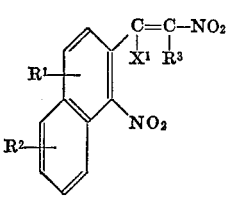

(VIII)

by reduction with a reducing agent such as iron in acetic acid.

(iii) The Weerman Synthesis in which a compound of formula

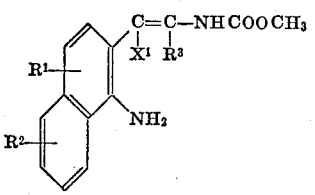

(IX)

is cyclised by treatment with a base such as alkali metal hydroxide.

(iv) The Baeyer-Emmerling Synthesis in which a compound of formula

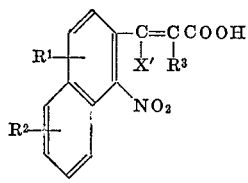

(X)

is cyclised by treatment with iron and an alkali metal hydroxide; or a compound of formula

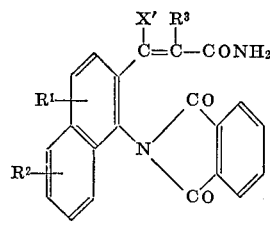

(XI)

is cyclised by treatment with an alkali-metal hypochlorite followed by a mineral acid such as hydrochloric acid.

(v) The Thiele-Dimroth Synthesis in which a compound of formula

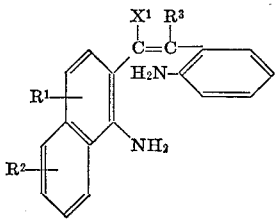

(XII)

is heated with a mineral acid such as hydrochloric acid.

(vi) The Foulds-Robinson Synthesis in which a compound of formula

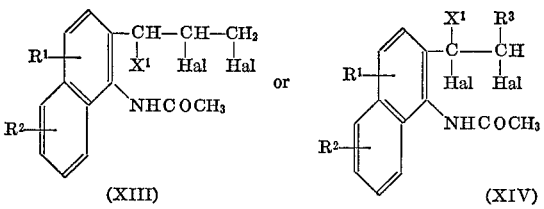

(XIII)       (XIV)

is treated with an alkali metal hydroxide.

(viii) The Baeyer-Jackson Synthesis in which a compound of formula

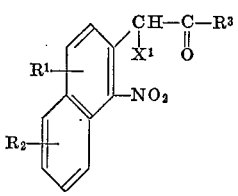

(XV)

is reduced by such reagents as zinc and ammonium hydroxide, iron and sodium bisulphite and stannous chloride.

(E) The following two less preferred miscellaneous reactions may also give rise to the benz[g]indoles of formula (II):

(i) Heating a compound of formula

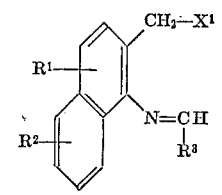

(XVI)

or (ii) Heating a compond of formula

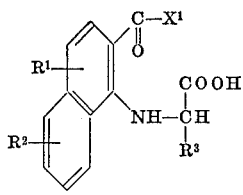

(XVII)

with a mixture of sodium acetate and acetic anhydride.

All of the reactions outlined above in sections A to E bear a formal analogy to each other in that the benz[g]indole system is built up by forming the heterocyclic pyrrole ring from an appropriately substituted naphthalene. However, it is also possible to prepare the compounds of formula (II) by cyclising a pyrrole or indole compound of formula

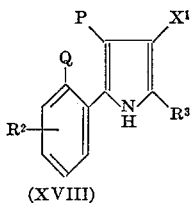 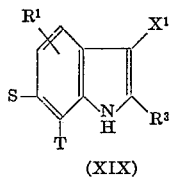

(XVIII) (XIX)

in which P, Q, S and T are suitable reactive groups capable of being cyclised to form a six-membered aromatic ring. In addition, the compound of the invention may also be prepared by dehydrogenating a substituted benz[g]indoline of formula

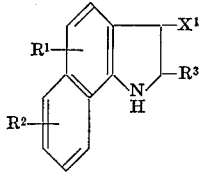

(XX)

When a benz[g]indole is formed in which $X^1$ does not have the same meaning as X but is a hydrogen atom or some other precursor group convertible thereto such as a cyanoalkyl, malonic ester, hydroxyalkyl, diazoketone, haloalkyl, formyl, carboxy, carboxyalkyl, alkali metalloalkyl, halogen, ketone or methyl residue, then $X^1$ is converted to X by generally known reactions such as hydrolysis, alcoholysis, chain extension, oxidation, splitting-off carbon dioxide, reduction, Grignard formation, carbonation and halogenation. In addition one group X may be converted to another group X within its meanings already defined.

In more detail, when $X^1$ is not the same as X but is a hydrogen atom or other precursor of X, it can be subjected to one or more agents for conversion of the $X^1$ group to X defined as above or one group X can be converted to another group X as follows:

(i) A haloalkyl group e.g. a chloromethyl group is reacted with an alkali metal cyanide, e.g. sodium or potassium cyanide and the nitrile obtained is hydrolysed to give a carboxyalkyl or carboxamidoalkyl group X (chain extension and hydrolysis).

(ii) A haloalkyl group is reacted with an alkali metal derivative of a diester such as a malonic acid diester and the product is hydrolysed thereby splitting off carbon dioxide to give a carboxyalkyl group X (chain extension, hydrolysis and splitting off carbon dioxide).

(iii) A —COOH group is reacted with successively (a) a halogenating agent, (b) diazomethane and (c) water or an alcohol, or ammonia or an amine in the presence of a catalyst, e.g. colloidal silver or silver oxide (Arndt-Eistert reaction) to give a carboxyalkyl, carboalkoxylalkyl or carboxamidoalkyl radical X respectively (chain extension).

(iv) An ester, amide or nitrile group is reacted with a hydrolysing agent to give a carboxyalkyl group X (hydrolysis).

(v) An acid group is esterified with an alcohol to give a carboalkoxyalkyl radical X (esterification).

(vi) An ester group is reacted with hydroxylamine to give a hydroxamic acid (hydroxamation).

(vii) An acid group or its salt i.e. an alkali metal or amine salt is reacted with an acyloxymethyl halide e.g. an acetoxymethyl halide to give an acyloxymethyl ester or a carboxalkyl group X (esterification).

(viii) A nitrile group is hydrolysed, or alcoholised to give an acid, amide or ester group X (hydrolysis or alcoholysis).

(ix) An acid group or its functional derivative is reacted with ammonia, or an ammonium salt is heated to give a carboxamidoalkyl group X (amidation).

(x) A nitrile group is reacted with hydrogen sulphide to give a thiocarboxamidoalkyl group X (thioamidation).

(xi) A hydroxymethyl radical is reacted with a halogenating agent to give a halomethyl radical which is subjected to step (i) or (ii), or the hydroxymethyl radical is oxidised to a formyl radical which is condensed with a malonic acid or malonic ester by a Knoevenagel reaction, thereby splitting off carbon dioxide to give an acrylic acid or ester group X (chain extension and splitting off carbon dioxide).

(xii) A group $—C_nH_{2n}—M$ where M is an alkali metal atom is reacted with a haloaliphatic acid ester to give a carboalkoxyalkyl group X (chain extension and hydrolysis).

(xiii) A methyl group is halogenated e.g. with N-bromosuccinimide and the halomethyl group is subjected to step (i) or (ii) or is oxidised to a formyl group by the Sommelet reaction and the formyl radical is condensed with a malonic acid or ester by a Knoevenagel reaction, thereby splitting off carbon dioxide to give an acrylic acid or ester group X (chain extension and splitting off carbon dioxide).

(xiv) Reducing an acrylic acid or ester group to a propionic acid or ester group X by catalytic hydrogenation (reduction).

(xv) A —CHO, —COOH or —COOAlkyl group is reduced with a hydride transfer agent such as a metal hydride to give the corresponding alcohol which may then be treated as in (xi) above.

(xvi) A halo group is reacted with magnesium to form the corresponding Grignard reagent and then treated with carbon dioxide to give the corresponding carboxylic acid group which may then be treated as in (iii) or (xv) above.

(xvii) A methyl group is oxidised to the corresponding carboxyl group which is treated as in (iii) or (xv) above.

(xviii) A ketone group is reduced to the corresponding alcohol or reacted with an alkyl magnesium halide to give the tertiary alcohol which may then be treated as in (xi) above.

(xix) A formyl group is oxidised to a carboxyl group by treatment with alkaline potassium permanganate and then treated as in (iii) and (x) above.

(xx) A compound in which $X^1$ is a hydrogen atom is converted into a compound in which $X^1$ is a formyl (—CHO) radical by (a) reaction with chloroform and alcoholic potassium hydroxide or (b) reaction with hydrogen cyanide and hydrogen chloride or (c) conversion to a Grignard reagent by reaction with an alkyl magnesium halide and then treatment with ethyl formate; or (d) reaction with N-methylformanilide and phosphoryl chloride; the formyl group thus obtained is then subjected to the reactions outlined in (vii) and (x) above for a formyl compound.

(xxi) A compound in which $X^1$ is a hydrogen atom is converted into a compound in which $X^1$ is a ketone residue (—CO.Alkyl; wherein alkyl is a lower alkyl radical) by (a) conversion to a Grignard reagent by reaction with an alkyl magnesium halide and then treatment with a lower alkanoyl chloride or (b) treatment with a mixture of acetic anhydride and sodium acetate or (c) treatment with a lower alkyl cyanide or (d) treatment with acetyl chloride or acetic anhydride at elevated temperature; the ketone group thus obtained is then treated as in (xiii) above.

(xxii) A compound in which $X^1$ is a hydrogen atom is converted into a compound in which $X^1$ is a carboxyl radical by conversion to a Grignard reagent by reaction with an alkyl magnesium halide and then treatment with carbon dioxide; the thus formed carboxyl group is then treated as in (iii) and (x) above.

(xxiii) A compound in which $X^1$ is a hydrogen atom is converted into a compound in which $X^1$ is an aliphatic acid radical or a derivative thereof by (a) treatment with dimethylamine and formaldehyde to give the compound in which $X^1$ is a dimethylaminomethyl radical and then (i) treating with a boiling aqueous solution of an alkali metal cyanide to give an easily separable mixture of the acetic acid derivative and its amide or (ii) treating the quaternary salt with the sodio derivative of a malonic ester followed by saponification and decarboxylation to give the propionic acid derivative or (iii) treating the quaternary salt with the sodio derivative to a cyanoacetic ester followed by hydrolysis and decarboxylation to give the propionic acid derivative; or (b) treatment with the alkali metal salt, particularly the potassium salt, of an acid of formula

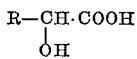

(in which R is hydrogen, or a lower alkyl radical) in the presence of an alkali metal hydroxide, particularly potassium hydroxide, at 250° C. to give the compound of formula

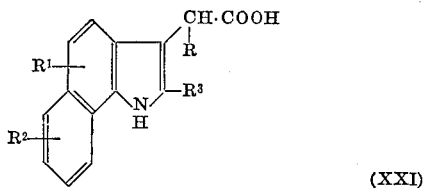

(XXI)

or (c) treatment at 225–300° C. with acrylic or methacrylic acid in the presence of an alkali metal hydroxide to give the corresponding propionic or α-methylpropionic acid derivative.

(xxiv) A compound in which $X^1$ is a hydrogen atom is converted into a compound in which $X^1$ is a cyanoalkyl radical by (a) treatment with a mixture of dimethylamine and formaldehyde followed by reaction with an alkali metal cyanide or (b) conversion to a Grignard reagent by treatment with an alkyl magnesium halide followed by treatment with a halonitrile such as β-chloropropionitrile; the cyanoalkyl radical thus formed may be treated as described in (v) and (vi) above.

(xxv) A compound in which $X^1$ is a hydrogen atom may be converted into a compound in which $X^1$ is a halo group by treatment with a suitable halogenating agent; for example, an iodo group may be introduced by treatment with iodine in potassium iodide solution or a bromo group may be introduced by treatment with pyridinium bromide perbromide; the halo group formed may then be treated as described in (xi) above.

(xxvi) A compound in which $X^1$ is a hydrogen atom may be converted into a compound in which $X^1$ is a hydroxyalkyl group by (a) treatment with a mixture of dimethylamine and formaldehyde to give the compound in which $X^1$ is a dimethylaminomethyl group followed by reaction with methyl iodide in methanol solution, or (b) conversion to a Grignard reagent by treatment with an alkyl magnesium halide followed by reaction with ethylene oxide; the hydroxyalkyl group thus formed may be be treated as described in (xi) above.

In addition, when the benz[g]indole of formula (I) has been produced in which $R^4$ is a hydrogen atom, this may be acylated by known methods to give the compounds of formula (I) in which $R^4$ is an aroyl or heteroaroyl group. For instance, the starting material can be treated with an alkali metal hydride or amide such as sodium hydride or sodamide to form for example the sodium salt, and then reacting the said salt with an acid halide, anhydride, azide, thiophenolic ester or phenolic ester of the aryl or heteroaryl acylating acid. It is preferred to carry out the acylation on the ester or amide derivative of the aliphatic acid radical X. When the free acid is desired, the ester or amide is converted by known methods to the free acid. For example, if the benzyl ester is used this is subsequently removed by hydrogenolysis, or if a t-butyl ester is used this is removed by heating to above 200° C., or by heating to 110° C. in the presence of a sulphonic acid or other acid. When an amide is used, this is converted to the free acid by reaction with nitrous acid in an inert solvent.

As the compounds of general formula (I) generally show pharmaceutical activity such as anti-inflammatory activity, the invention provides a pharmaceutical composition comprising a compound of general formula (I), and a pharmaceutically acceptable carrier.

When the compounds of this invention are employed as anti-inflammatory agents they can be administered to warm-blooded animals, e.g. mice, rats, rabbits, dogs, cats, monkeys, etc., alone or as a pharmaceutical composition in combination with pharmaceutically acceptable carriers. The carrier may be solid, liquid or cream-like and any suitable carrier known to the art can be used. The composition can be in unit dose form, for example as tablets or capsules or it can be in the form of a solution. The compositions can be administered orally or parenterally by injections and the composition can, for parenteral administration, be in the form of a sterile solution or suspension containing other solutes, for example enough saline or glucose to render the solution isotonic. The particular carrier and proportion of carrier to active compound will be determined by the nature of the compounds, and the chosen route of administration and standard pharmaceutical practice.

The dosage of the active compound will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful, or deleterious side effects.

The following Examples illustrate the invention:

EXAMPLE 1

2-(p-Chlorophenyl)-1H-benz[g]indol-3-ylacetic acid (a) A mixture of ethyl 3-(p-chlorobenzoyl)propionate (40.1 g.) and 1-naphthyl-hydrazine hydrochloride (32.5 g.) in glacial acetic acid (50 ml.) was heated under reflux for 10 minutes, cooled and poured into water. The precipitated solid was filtered off, dried and recrystallised from ethanol to give 37.0 g. of ethyl 2-(p-chlorophenyl)-1H-benz[g]indol-3-ylacetate, m.p. 185–187° C. (Found: C, 72.3; H, 5.0; N, 4.0. $C_{22}H_{18}ClNO_2$ requires, C, 72.6; H, 5.0; N, 3.9%).

(b) The ester (37.0 g.) of part (a) in ethanol (50 ml.) and water (200 ml.) containing sodium hydroxide (6.0 g.) was heated under reflux for 20 hours. The mixture was evaporated to dryness, the residue taken up in water, washed with ether, and acidified with hydrochloric acid. The precipitated solid was filtered off and recrystallised from aqueous ethanol to give 24.1 g. of the title acid, m.p. 203–205° C. (Found: C, 71.6, H, 4.5; N, 4.2. $C_{20}H_{14}ClNO_2$ requires C, 71.5; H, 4.2; H, 4.2%).

EXAMPLE 2

2-Methyl-1H-benz[g]indol-3-ylacetic acid

A mixture of laevulinic acid (3.5 g.) and 1-naphthylhydrazine hydrochloride (5.8 g.) in glacial acetic acid (25 ml.) was heated under reflux for 10 minutes, cooled, poured into water, the solid filtered off and dried. Recrystallisation from aqueous ethanol gave 3.8 g. of the title compound, m.p. 191–192° C. (Found: C, 75.3; H, 5.6; N, 5.7. $C_{15}H_{13}NO_2$ requires C, 75.3; H, 5.5; N, 5.9%).

EXAMPLE 3

2-(p-Fluorophenyl)-1H-benz[g]indol-3-ylacetic acid

A mixture of 3-(p-fluorobenzoyl)propionic acid (5.9 g.) and 1-naphthylhydrazine hydrochloride (5.8 g.) in glacial acetic acid (25 ml.) was heated under reflux for 10 minutes, cooled, poured into water, the solid filtered off and dried. Recrystallisation from aqueous ethanol gave 2.85 g. of the title compound, m.p. 210–211° C. (Found: C, 75.4; H, 4.5; N, 4.5. $C_{20}H_{14}FNO_2$ requires C, 75.2; H, 4.4; N, 4.4%).

EXAMPLE 4

Following the procedure of Example 3 using 1-naphthylhydrazine hydrochloride, the following ketones give the benz[g]indoles indicated.

| Ketone | Benz[g]indole |
| --- | --- |
| 4-oxo-decanoic acid | 2-hexyl-1H-benz[g]indol-3-ylacetic acid. |
| 4-oxo-octanoic acid | 2-butyl-1H-benz[g]indol-3-ylacetic acid. |
| 3-benzoylpropionic acid | 2-phenyl-1H-benz[g]indol-3-ylacetic acid. |
| 3-(p-bromobenzoyl)propionic acid | 2-(p-bromophenyl)-1H-benz[g]indol-3-ylacetic acid. |
| 3-(p-methylbenzoyl)propionic acid | 2-(p-methylphenyl)-1H-benz[g]indol-3-ylacetic acid. |
| 3-(p-butylbenzoyl)propionic acid | 2-(p-butylphenyl)-1H-benz[g]indol-3-ylacetic acid. |
| 3-(p-methoxybenzoyl)propionic acid | 2-(p-methoxyphenyl)-1H-benz[g]indol-3-ylacetic acid. |
| 3-(p-butyloxybenzoyl)propionic acid | 2-(p-butyloxyphenyl)-1H-benz[g]indol-3-ylacetic acid. |
| 3-(p-nitrobenzoyl)propionic acid | 2-(p-nitrophenyl)-1H-benz[g]indol-3-ylacetic acid. |
| 3-(p-dimethylaminobenzoyl)propionic acid | 2-(p-dimethylaminophenyl)-1H-benz[g]indol-3-ylacetic acid. |
| 3-(m-trifluoromethylbenzoyl)propionic acid | 2-(m-trifluoromethylphenyl)-1H-benz[g]indol-3-ylacetic acid. |
| 3-(naphth-1-ylcarbonyl)propionic acid | 2-(naphth-1-yl)-1H-benz[g]indol-3-ylacetic acid. |
| 3-(fur-3-ylcarbonyl)propionic acid | 2-(fur-3-yl)-1H-benz[g]indol-3-ylacetic acid. |
| 3-(thien-3-ylcarbonyl)propionic acid | 2-(thien-3-yl)-1H-benz[g]indol-3-ylacetic acid. |
| 3-(pyrid-4-ylcarbonyl)propionic acid | 2-(pyrid-4-yl)-1H-benz[g]indol-3-ylacetic acid. |
| 3-(indol-3-ylcarbonyl)propionic acid | 2-(indol-3-yl)-1H-benz[g]indol-3-ylacetic acid. |
| 3-(pyrrol-3-ylcarbonyl)propionic acid | 2-(pyrrol-3-yl)-1H-benz[g]indol-3-ylacetic acid. |

EXAMPLE 5

Following the procedure of Example 3 using 3-(p-fluorobenzoyl)propionic acid, the following hydrazines give the products indicated:

| Hydrazine | Benz[g]indole |
| --- | --- |
| 4-chloronaphth-3-ylhydrazine. | 2-(p-fluorophenyl)-5-chloro-1H-benz[g]indol-3-ylacetic acid. |
| 4-bromonaphth-1-ylhydrazine. | 2-(p-fluorophenyl)-5-bromo-1H-benz[g]indol-3-ylacetic acid. |
| 4-fluoronaphth-1-ylhydrazine. | 2-(p-fluorophenyl)-5-fluoro-1H-benz[g]indol-3-ylacetic acid. |
| 5-methylnaphth-1-ylhydrazine. | 2-(p-fluorophenyl)-6-methyl-1H-benz[g]indol-3-ylacetic acid. |
| 5-(n-butyl)naphth-1-ylhydrazine. | 2-(p-fluorophenyl)-6-(n-butyl)-1H-benz[g]indol-3-ylacetic acid. |
| 5-(n-hexyl)naphth-1-ylhydrazine. | 2-(p-fluorophenyl)-6-(n-hexyl)-1H-benz[g]indol-3-ylacetic acid. |
| 4-methoxynaphth-1-ylhydrazine. | 2-(p-fluorophenyl)-5-methoxy-1H-benz[g]indol-3-ylacetic acid. |
| 4-(n-butyloxy)naphth-1-ylhydrazine. | 2-(p-fluorophenyl)-5-(n-butyloxy)-1H-benz[g]indol-3-ylacetic acid. |
| 4-(n-hexyloxy)naphth-1-ylhydrazine. | 2-(p-fluorophenyl)-5-(n-hexyloxy)-1H-benz[g]indol-3-ylacetic acid. |

EXAMPLE 6

Following the procedure of Example 3 using 1-naphthylhydrazine hydrochloride the following ketones give the products indicated:

| Ketone | Benz[g]indole |
| --- | --- |
| 4-(p-fluorobenzoyl)butyric acid. | 3-[2-(p-fluorophenyl)-1H-benz[g]indol-3-yl]propionic acid. |
| 5-(p-fluorobenzoyl)valeric acid. | 4-[2-(p-fluorophenyl)-1H-benz[g]indol-3-yl]butyric acid. |
| 6-(p-fluorobenzoyl)caproic acid. | 5-[2-(p-fluorophenyl)-1H-benz[g]indol-3-yl]valeric acid. |
| 7-(p-fluorobenzoyl)heptylic acid. | 6-[2-(p-fluorophenyl)-1H-benz[g]indol-3-yl]caproic acid. |
| n-Butyl 2-(p-fluorobenzoyl)propionate. | n-Butyl 2-(p-fluorophenyl)-1H-benz[g]indol-3-ylacetate. |
| 2-(p-fluorobenzoyl)propionate. | 2-(p-fluorophenyl)-1H-benz[g]indol-3-ylacetate. |
| N-isopropyl-3-[(p-fluorobenzoyl)]propionamide. | N-isopropyl-[2-(p-fluorophenyl)-1H-benz[g]indol-3-yl]acetamide. |
| N,N-diethyl-3-[(p-fluorobenzoyl)]propionamide. | N,N-diethyl-[2-(p-fluorophenyl)-1H-benz[g]indol-3-yl]acetamide. |

EXAMPLE 7

Ethyl N-benzoyl-2-(p-chlorophenyl)-1H-benz[g]indol-3-ylacetate

The ethyl ester of Example 1(a) is dissolved in dimethylformamide and treated with a 50% dispersion of sodium hydride in oil followed by benzoyl chloride. The resulting mixture is poured into ice-water, and extracted with chloroform. The organic extract is washed with aqueous potassium bicarbonate solution, water, dried ($MgSO_4$) and evaporated giving a residue of the title compound.

The above procedure is repeated but replacing the benzoyl chloride by the following acid chloride to give the indicated products:

| Acid chloride | Benz[g]indole |
| --- | --- |
| p-Fluorobenzoyl chloride | Ethyl N-(p-fluorobenzoyl)-2-(p-chlorophenyl)-1H-benz[g]indol-3-ylacetate. |
| p-Chlorobenzoyl chloride | Ethyl N-(p-chlorobenzoyl)-2-(p-chlorophenyl)-1H-benz[g]indol-3-ylacetate. |
| p-Bromobenzoyl chloride | Ethyl N-(p-bromobenzoyl)-2-(p-chlorophenyl)-1H-benz[g]indol-3-ylacetate. |
| p-Methylbenzoyl chloride | Ethyl N-(p-methylbenzoyl)-2-(p-chlorophenyl)-1H-benz[g]indol-3-ylacetate. |
| p-(n-Butyl)benzoyl chloride. | Ethyl N[p-butyl)benzoyl]-2-(p-chlorophenyl)-1H-benz[g]indol-3-ylacetate. |
| p-Methoxybenzoyl chloride | Ethyl N-(p-methoxybenzoyl)-2-[p-chlorophenyl)-1H-benz[g]indol-3-ylacetate. |
| p-(m-Butyloxy)benzoyl chloride. | Ethyl N[p-(n-butyloxy)benzoyl]-2-(p-chlorophenyl)-1H-benz[g]indol-3-ylacetate. |
| p-Nitrobenzoyl chloride | Ethyl N-(p-nitrobenzoyl)-2-(p-chlorophenyl)-1H-benz[g]indol-3-ylacetate. |
| p-Dimethylaminobenzoyl chloride. | Ethyl N-(p-dimethylaminobenzoyl)-2-chlorophenyl)-1H-benz[g]indol-3-ylacetate. |
| m-Trifluoromethylbenzoyl chloride. | Ethyl N-(m-trifluoromethylbenzoyl)-2-(p-chlorophenyl)-1H-benz[g]indol-3-ylacetate. |
| 1-naphthoyl chloride | Ethyl N-(naphth-1-oyl)-2-(p-chlorophenyl)-1H-benz[g]indol-3-ylacetate. |
| 2-furoyl chloride | Ethyl N-(fur-2-oyl)-2-(p-chlorophenyl)-1H-benz[g]indol-3-ylacetate. |
| 2-thenoyl chloride | Ethyl N-(then-2-oyl)-2-(p-chlorophenyl)-1H-benz[g]indol-3-ylacetate. |
| 4-pyridinecarbonyl chloride. | Ethyl N-(pyrid-4-ylcarbonyl)-2-(p-chlorophenyl)-1H-benz[g]indol-3-ylacetate. |
| 3-indolylcarbonyl chloride. | Ethyl N-(indol-3-ylcarbonyl)-2-(p-chlorophenyl)-1H-benz[g]indol-3-ylacetate. |

EXAMPLE 8

| | Mg. |
| --- | --- |
| 2-(p-Chlorophenyl)-1H-benz[g]indol-3-ylacetic acid | 125 |
| Lactose | 120 |
| Magnesium stearate | 5 |

Capsules of the above are made up by thoroughly mixing together batches of the above ingredients and filling hard gelatine capsules (250 mg.) with the mixture.

EXAMPLE 9

| | Mg. |
| --- | --- |
| 2-(p-Fluorophenyl)-1H-benz[g]indol-3-ylacetic acid | 125 |

I claim:
1. A compound having the formula

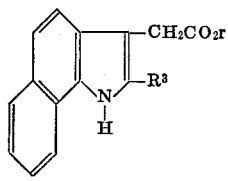

wherein $R^3$ represents a monohalophenyl radical and in which $r$ represents hydrogen or lower alkyl.

2. A compound according to Claim 1 which is 2-(p-chlorophenyl)-1H-benz[g]indol-3-ylacetic acid.

3. A compound according to Claim 1 which is ethyl 2-(p-chlorophenyl)-1H-benz[g]indol-3-ylacetate.

4. A compound according to Claim 1 which is 2-(p-fluorophenyl)-1H-benz[g]indol-3-ylacetic acid.

References Cited

Minardi et al.: *Chem. Abs.* 53: 10390h (1959).

JOSEPH A. NARCAVAGE, Primary Examiner

U.S. Cl. X.R.

260—295 B, 376.12 R, 376.12 A, 326.13 A, 326.14 A, 326 N; 424—274